D. B. WOOSTER.
Milk-Cooler.
No. 205,777. Patented July 9, 1878.
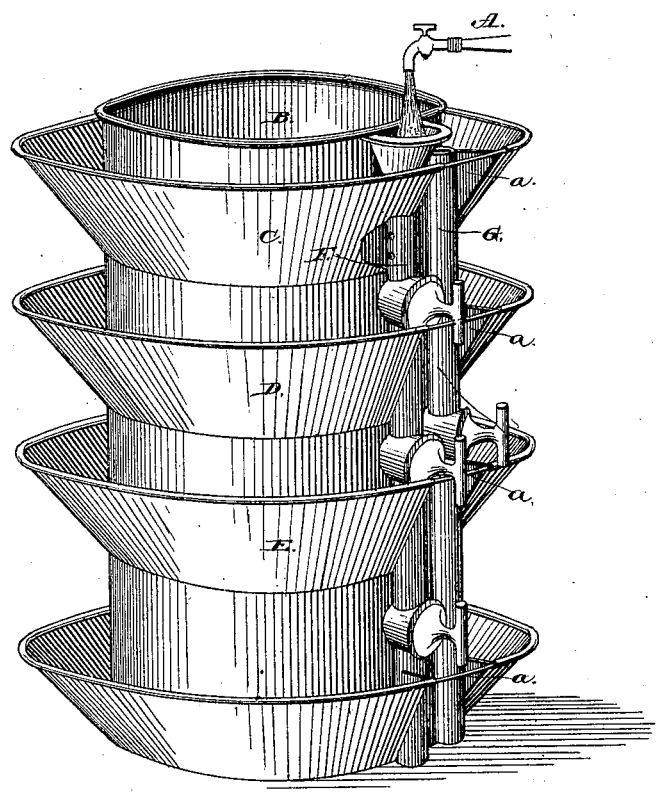
Attest:
E. J. Moore.
E. M. Wooster.
Inventor:
Daniel B. Wooster.

UNITED STATES PATENT OFFICE.

DANIEL B. WOOSTER, OF MARSHFIELD, VERMONT.

IMPROVEMENT IN MILK-COOLERS.

Specification forming part of Letters Patent No. 205,777, dated July 9, 1878; application filed March 10, 1877.

*To all whom it may concern:*

Be it known that I, DANIEL B. WOOSTER, of Marshfield, in the county of Washington and State of Vermont, have invented a new and useful Apparatus for Cooling or Heating Milk, the merits of which are fully set forth in the following specification, reference being had to the accompanying diagram.

The object of my invention is to rapidly raise the cream, which can then be removed from the milk, leaving the latter sweet for the manufacture of cheese.

To accomplish this object, I put the milk in the tin can B, which is surrounded by three receptacles for water, C, D, and E. These receptacles are of tin, three inches or more in height, flaring at the top, with the lower edge soldered to the can. Each receptacle is divided by a tin partition, *a a a*, on either side of which are the tubes F and G.

F receives the water from the faucet A, which water flows around the can in the receptacle C until it reaches the partition, where it enters the tube G and passes down to the first stop-cock in the tube G, when it is allowed to enter the receptacle D, and, after again flowing around the can in an opposite direction, it re-enters the tube F, and is carried to the third receptacle E, again makes the circuit of the can, and re-enters the tube G, which finally empties into the waste-pipe. By means of the stop-cocks in the tubes F and G one or more of the receptacles can be used, as required.

The advantage of my invention over all other milk-coolers consists in these particulars: The milk on the surface, being cooled by the water in the upper receptacle, drops to the bottom, leaving the oily portion or cream to float at the top, while the warm milk from the bottom rises to be cooled, and deposits its cream in like manner. Thus a constantly-changing current carries the cream to the surface in the shortest possible space of time, and after its removal the milk is still sweet enough for the manufacture of cheese. All other coolers act on exactly reverse principles. Water applied to the bottom of the milk-pan cools the milk by slow and tedious process. Only a portion of the cream is ever brought to the surface, and when skimmed the milk is sour and of little further value.

I claim as my invention—

The combination, in a milk-cooler, of the receptacles C, D, and E, the tin partitions *a a a*, and the tubes F and G, as substantially set forth and described.

DANIEL B. WOOSTER.

Witnesses:
E. M. WOOSTER,
E. J. MOORE.